(12) United States Patent
Pierce

(10) Patent No.: US 10,047,538 B2
(45) Date of Patent: Aug. 14, 2018

(54) FLAG ATTACHMENT APPARATUS

(71) Applicant: Alex Robert Pierce, Wynnewood, PA (US)

(72) Inventor: Alex Robert Pierce, Wynnewood, PA (US)

( * ) Notice: Subject to any disclaimer, the term of this patent is extended or adjusted under 35 U.S.C. 154(b) by 0 days.

(21) Appl. No.: 15/599,037

(22) Filed: May 18, 2017

(65) Prior Publication Data
US 2017/0335593 A1    Nov. 23, 2017

Related U.S. Application Data

(60) Provisional application No. 62/338,795, filed on May 19, 2016.

(51) Int. Cl.
| | | |
|---|---|---|
| *A47G 33/12* | (2006.01) | |
| *E04H 13/00* | (2006.01) | |
| *F16B 2/22* | (2006.01) | |
| *F16B 2/24* | (2006.01) | |
| *F16M 13/02* | (2006.01) | |

(52) U.S. Cl.
CPC .......... *E04H 13/001* (2013.01); *F16B 2/22* (2013.01); *F16B 2/243* (2013.01); *F16B 2/245* (2013.01); *F16M 13/022* (2013.01)

(58) Field of Classification Search
CPC ....... E04H 13/001; F16M 13/022; F16B 2/22; F16B 2/243; F16B 2/245
USPC .......... 40/218, 591; 248/540, 538, 534, 535, 248/536, 539
See application file for complete search history.

(56) References Cited

U.S. PATENT DOCUMENTS

| | | | | |
|---|---|---|---|---|
| 1,276,496 | A * | 8/1918 | Crosley ................. | A01K 97/10 16/384 |
| 2,879,570 | A * | 3/1959 | Becker .................... | F16B 2/243 403/397 |
| 3,825,214 | A * | 7/1974 | Ciolfi ..................... | B62J 11/00 248/300 |
| 3,905,070 | A * | 9/1975 | Macrae ................... | F16B 2/245 403/191 |
| 3,959,854 | A * | 6/1976 | Lewis .................. | A47B 13/086 160/330 |
| 7,530,537 | B2* | 5/2009 | Kandah ............... | B65B 67/1216 220/482 |
| 7,823,853 | B2* | 11/2010 | Larson .................... | F16B 45/00 24/370 |
| 7,934,690 | B1* | 5/2011 | Walter .................. | E04H 13/001 248/539 |
| 2004/0134410 | A1* | 7/2004 | Tal ........................... | B60Q 1/50 116/28 R |

* cited by examiner

*Primary Examiner* — Christopher Garft
(74) *Attorney, Agent, or Firm* — Volpe and Koenig, P.C.

(57) ABSTRACT

A flag attachment apparatus includes a first planar portion and a second portion. The first planar portion includes a first side and a second side, a plurality of ribs on the first side, and a deflectable middle portion disposed between two slits. The second portion includes a first angle plate and a second angle plate, both attached to a first end of the first planar portion and proceeding outward from the first planar portion such that a first angle is formed between the first angle plate and the second angle plate.

6 Claims, 6 Drawing Sheets

FLAG ATTACHMENT APPARATUS

CROSS REFERENCE TO RELATED APPLICATION

This application claims the benefit of U.S. Provisional Application No. 62/338,795, filed May 19, 2016, which is incorporated by reference as if fully set forth.

FIELD OF INVENTION

This application pertains to attaching objects such as flags to other objects such as a memorial wall in a cemetery.

BACKGROUND

Honoring veterans is a very important act that shows appreciation for the sacrifices made by the men and women who served the nation, and even more so where those veterans have made the ultimate sacrifice in the service of the nation. Very often in cemeteries, one will see flags planted on the graves of veterans to show appreciation for the services of those buried there. However, many cemeteries, including veterans' cemeteries, have their honored dead buried in wall crypts, with a placard on the front of a wall plate that indicates the name, and often service history, of the veteran. In these cases, placing a flag in honor of an individual veteran is more difficult than placing one in the ground at his or her gravesite.

SUMMARY

The present application is directed to a flag attachment apparatus. The flag attachment apparatus includes a first planar portion and a second portion. The first planar portion includes a first side and a second side, a plurality of ribs on the first side, and a deflectable middle portion disposed between two slits. The second portion includes a first angle plate and a second angle plate, both attached to a first end of the first planar portion and extending outward from the first planar portion such that a first angle is formed between the first angle plate and the second angle plate

BRIEF DESCRIPTION OF THE DRAWINGS

A more detailed understanding may be had from the following description, given by way of example in conjunction with the accompanying drawings, wherein.

DETAILED DESCRIPTION

Figure 1A:
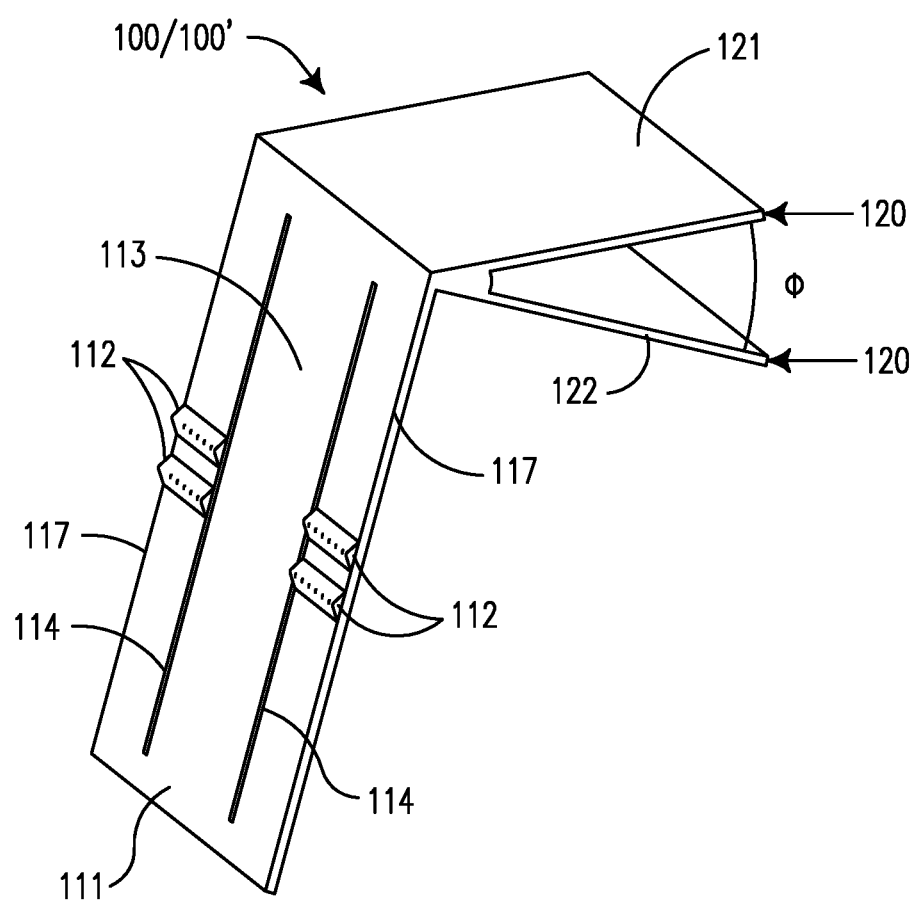
FIG. 1A is front perspective view of an example flag attachment apparatus.
Figure 1B:
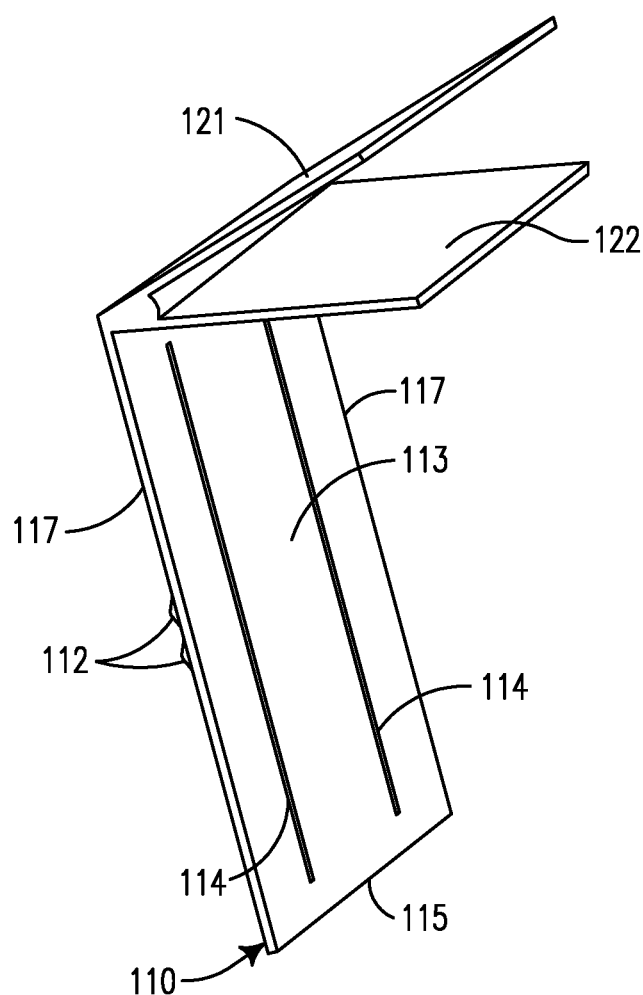
FIG. 1B is a rear perspective view of the example flag attachment apparatus of FIG. 1A.
Figure 1C:
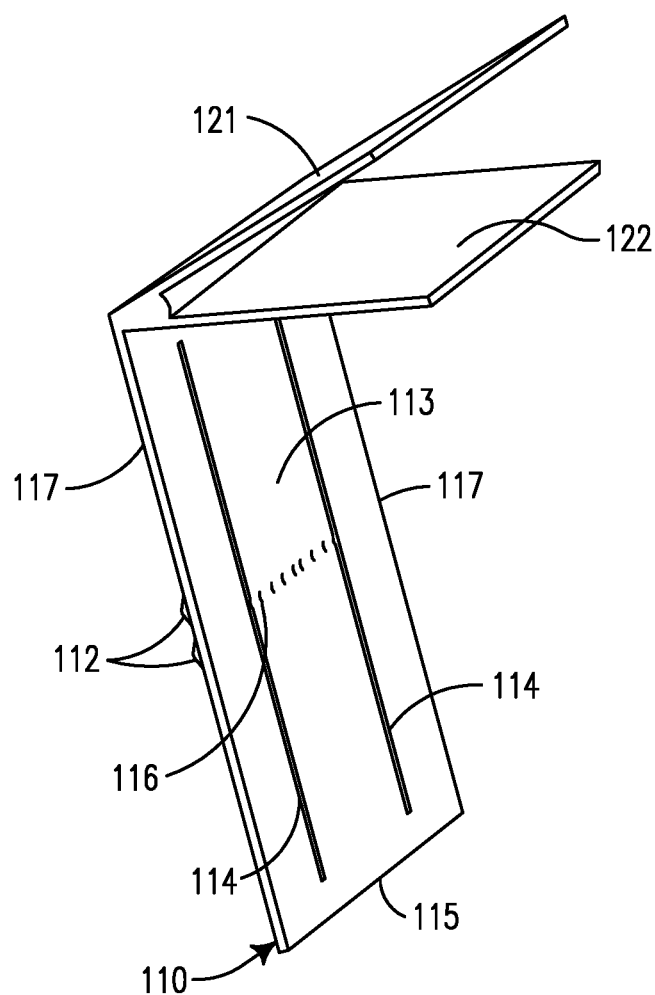
FIG. 1C is an alternative rear perspective view of the example flag attachment of FIG. 1A.

Referring now to the drawings, wherein like reference numerals refer to the same components across the several views, and in particular to FIGS. 1A, 1B and 1C, front and rear perspective views of an example flag attachment apparatus 100 and alternative apparatus 100' are shown. The flag attachment apparatus 100/100' may be attached to a wall, such as a memorial wall in a veterans' cemetery for hanging a flag in honor of a veteran at his or her crypt.

The flag attachment apparatus 100/100' includes a first planar portion 110 and a second, preferably v-shaped, portion 120 attached at one end of the first planar portion 110. The first planar portion 110 includes a first side 111. The first side 111 includes a substantially flat middle portion 113 with slits 114 disposed along the middle portion 113 at least partially separating it from two edge portions 117. The slits 114 run substantially from the end of the first portion 110 attached to the v-shaped portion 120 to a point spaced apart from the end opposite the v-shaped portion 120. In this manner, middle portion 113 is capable of being deflected in either direction toward the first side 111 or away from the first side 111. Also disposed on the front side 111 are ribs 112. As shown in FIG. 1A, there are, preferably, four ribs 112, with two ribs 112 disposed on each of the edge portions 117 on either side of the middle portion 113. The ribs 112 extend from the slit 114 on either side of middle portion 113 to the outer edges of the first portion 110. The ribs 112 as depicted in FIG. 1A are generally triangular shaped, but other shapes can be utilized as well, such as rectangular, semi-cylindrical, or the like. Also as shown in FIG. 1A, the ribs 112 are disposed generally halfway between the edge of first portion 110 that is attached to the v-shaped portion 120 and the opposite edge of first portion 110. The ribs 112 on each edge portion 117 are separated to form a channel between them.

Still referring to FIGS. 1A, 1B and 1C, the second portion 120 includes a first angle plate 121 and a second angle plate 122. The first angle plate 121 and the second angle plate 122 are attached at one end to the first portion 110 and extend generally outward forming an angle Φ. The first and second angle plates 121 and 122 respectively, are preferably resiliently deflectable related to each other. The angle Φ generally relates to an angle where the first angle plate 121 and second angle plate 122 are not compressed toward one another, and may also refer to the angle that allows the flag attachment apparatus 100/100' to be secured to a structure. While the first and second angle plates 121 and 122 are shown as flat, they could also be curved or have one or more steps or bends.

Referring now to FIG. 1B, a rear side 115 of the first planar portion 110 can be seen for apparatus 100. In addition to the components described above, a second side 115 of the first planar portion 110 is shown. The second side 115 is the rear side of the first planar portion 110. Upon deflection of the middle portion 113 toward the front of the first planar portion 110, an object, (e.g., flag shaft), can be held between the rear side of middle portion 113 and the ribs 112 on the edge portions 117 such that the middle portion 113 holds the shaft tightly against the front of the edge portions 117 of the first planar portion 110.

Referring now to FIG. 1C, a rear side 115 of the first planar portion 110 can be seen for apparatus 100'. In addition to the components described above, a second side 115 of the first planar portion 110 is shown. The second side 115 which is the rear side of the first planar portion 110 depicts a recessed channel 116 extending between slits 114 on the back of the middle portion 113. The recessed channel 116 is generally disposed to cooperate with the ribs 112 such that the recessed channel 116 is located to line up with the channel between two ribs 112 that are disposed on the edge portions 117 on the first side 111 of the first planar portion 110. In this manner, upon deflection of the middle portion 113 in the direction of the first side 111, a generally continuous channel is formed by the two channels on each edge portion 117 of the first side 111 between each rib pair 112, and the recessed channel 116 of the second side 115. It is also contemplated that the ribs 112 can be omitted and only the recessed channel 116 utilized to aid in securing the shaft.

Figure 2:
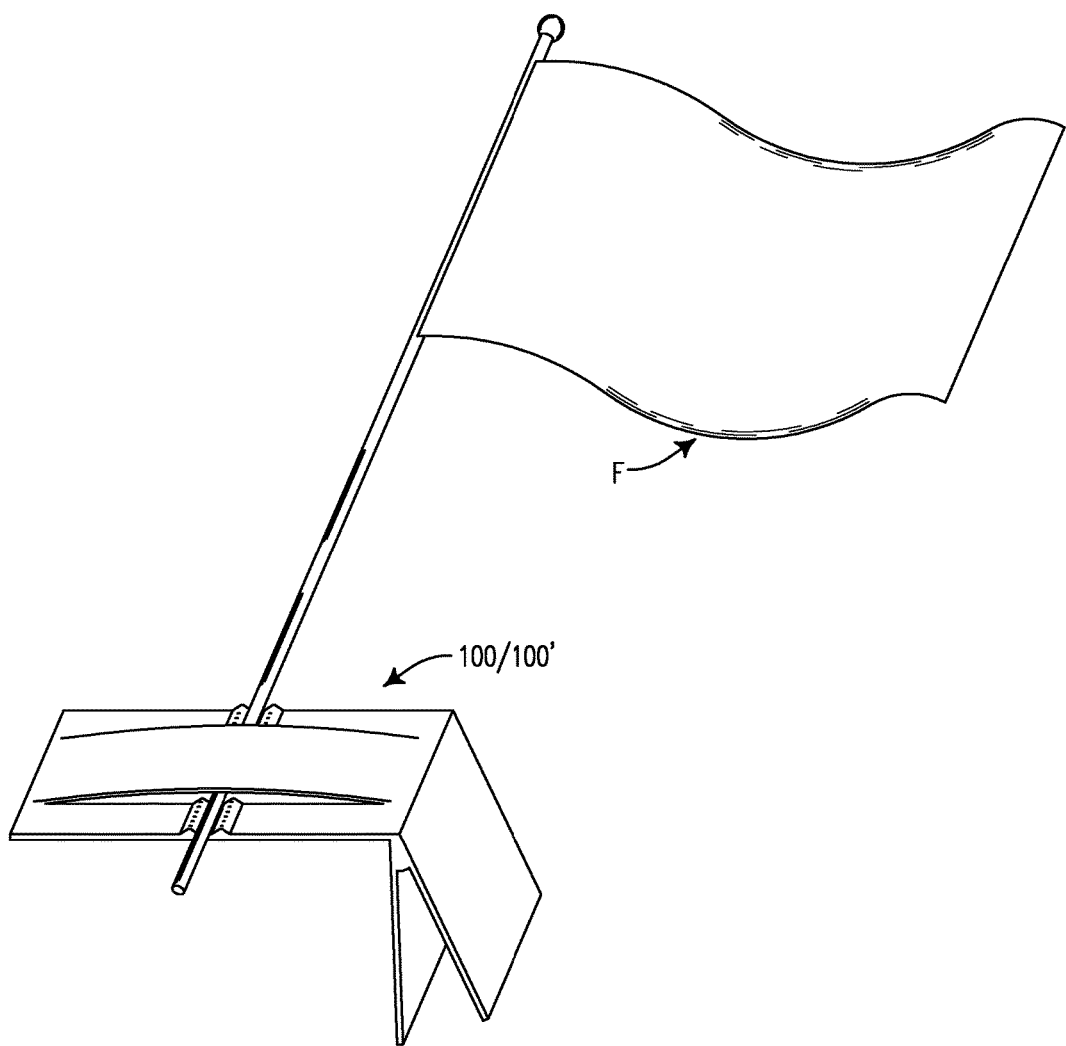
FIG. 2 is a front perspective representation of the example flag attachment apparatus of FIGS. 1A and 1B, including an attached flag.

FIG. 2 is a front perspective representation of the example flag attachment apparatus 100/100' of FIGS. 1A and 1B, including an attached flag F. The flag F may include a shaft S and a banner B. As described above in FIGS. 1A, 1B and 1C, upon deflection of the middle portion 113 in the direction of the first planar portion 111, a continuous channel is formed between each pair of ribs 112 and the rear of middle portion 113. With respect to FIG. 1C, if present, the recessed portion 116 will coincide with the channel between the ribs 112. Shaft S can then be inserted along the channel formed and secured in place to allow the flag attachment apparatus 100/100' to secure the flag F.

Figure 3A:
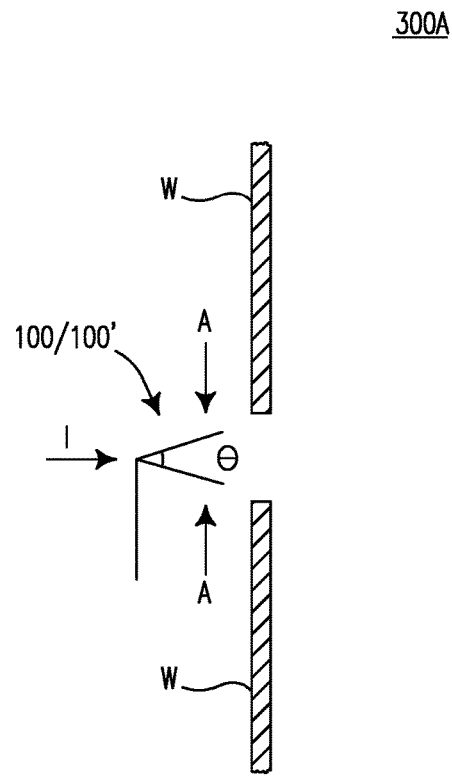
FIG. 3A depicts an example diagram of the example flag attachment apparatus being placed into a structure.

FIG. 3A depicts an example diagram of the example flag apparatus 100/100' being placed into a structure, such as a wall plates W. As shown in FIG. 3A, the wall plates W includes an opening such as one that might be found between the two wall plates of a memorial crypt in a veterans' cemetery. In FIG. 3A, the first angle plate 121 and the second angle plate 122 are compressed together. This may be accomplished for example by resiliently compressing the first angle plate 121 in the direction of arrow A and the second angle plate 122 in the direction of arrow A', for example, by squeezing the angle plates 121 and 122 together with fingers. Once the angle plates 121 and 122 are compressed, they form an angle θ, which is a smaller angle than angle Φ and smaller than a width of the opening between the wall plates W. The flag attachment apparatus 100/100' is then inserted into the opening between the wall plates W with the first and second angle plates 121 and 122 compressed in the direction of arrow I. It should be noted that the angle θ is not a specific angle, but can be any angle that allows the angle plates 121 and 122 to be resiliently compressed sufficiently so that the free ends are spaced apart less than the width of the opening between the wall plates W for insertion.

Figure 3B:
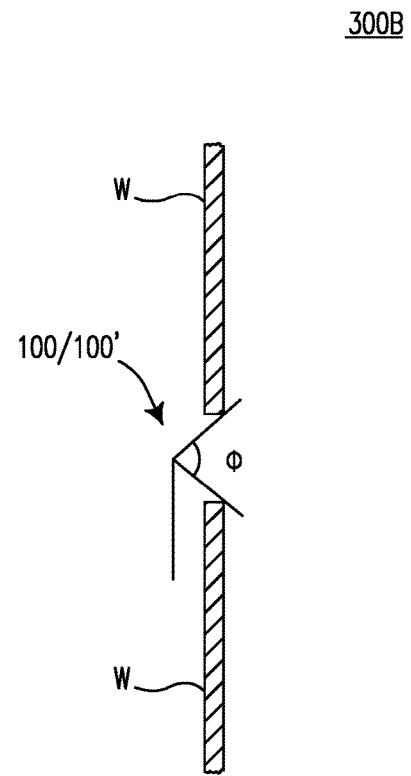
FIG. 3B depicts an example diagram of the example flag attachment apparatus fixed in the structure of FIG. 3A.

FIG. 3B depicts an example diagram of the example flag apparatus 100/100' fixed in the structure of FIG. 3A, such as wall plates W. In FIG. 3B, the first and second angle plates 121 and 122 are released from compression as described in FIG. 3A so that they expand away from one another back to an angle larger than angle θ. In the example shown in FIG. 3B, the first and second angle plates 121 and 122 are expanded to the completely uncompressed angle Φ. However, it should be noted that when the first and second angle plates 121 and 122 expand to press against the wall plates W, they may not be able to expand completely to angle Φ. Therefore, it is understood that the first and second angle plates 121 and 122 in FIG. 3B form whatever angle is necessary to cause them to abut the wall plates W in order to secure the flag attachment apparatus 100/100' in place.

Figure 4:
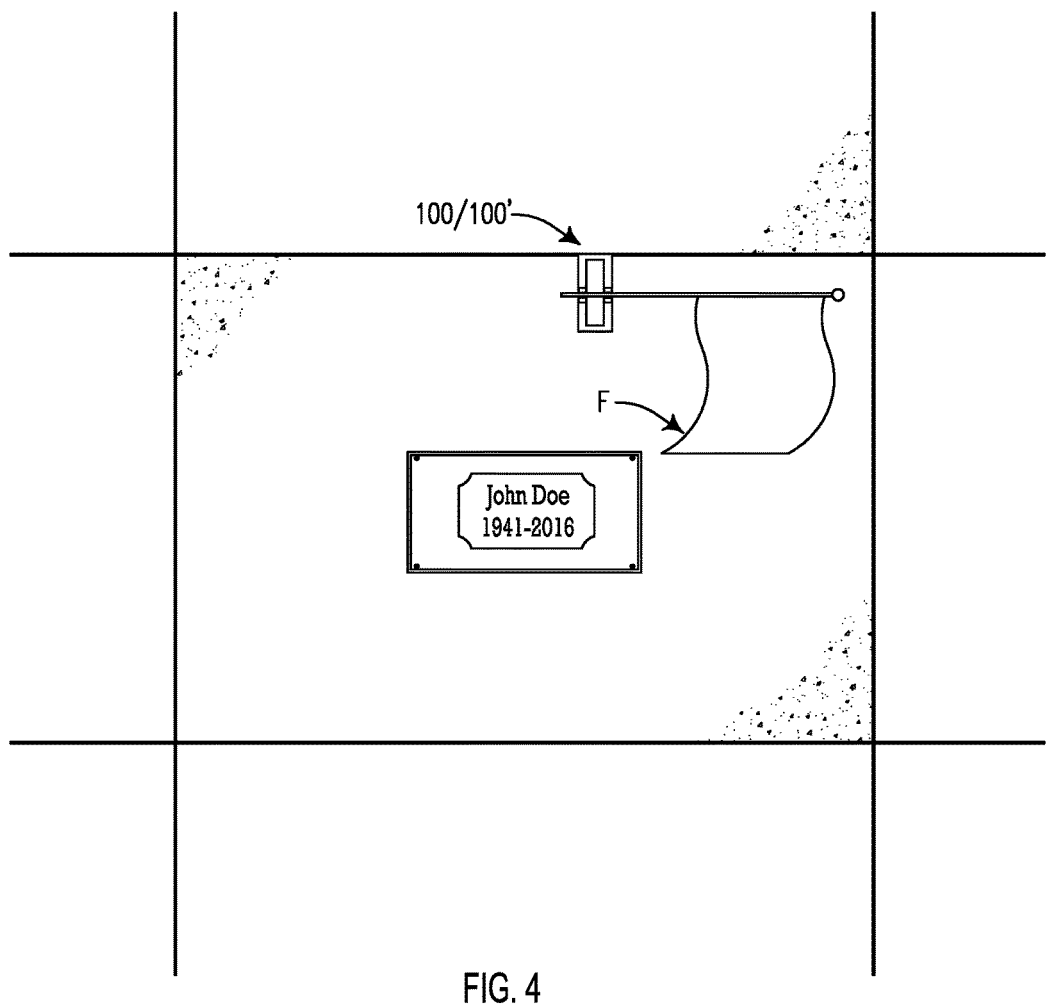
FIG. 4 is an example representation of the example flag attachment apparatus shown fixed in a memorial structure.

FIG. 4 is an example representation of the example flag attachment apparatus 100/100' shown fixed in a memorial structure. As shown, the flag attachment apparatus 100/100' is secured in an opening between two wall plates W of the memorial structure. The flag F has its shaft S secured in the flag attachment apparatus 100/100' in the manner described above in FIG. 2.

Changes or modifications may be made to the above-described embodiments without departing from the scope and spirit of the invention as set forth in the claims. For example, the flag attachment apparatus 100/100' is shown in the Figures above as being secured in a generally horizontal opening, however, it should be noted that the flag attachment apparatus 100/100' can be secured in a vertical opening or any other direction opening. Also, a flag F is shown as being secured the flag attachment apparatus 100/100', however, it should be noted that other objects apart from flags having similar characteristics that would allow them to be secured in the flag attachment apparatus 100/100' can also be secured. The flag attachment apparatus 100/100' can be formed of various materials, such as plastic, aluminum, or the like, to allow the angle plates to be compressed and expanded and the middle portion to be deflected. Preferably, the components of the flag attachment apparatus 100/100' are formed from a polymeric material such as a resilient plastic.

What is claimed is:

1. A flag attachment system, comprising:
   a flag attachment apparatus comprising:
      a first planar portion having a first side and a second side, the first planar portion including a deflectable middle portion disposed between a first slit and a second slit and a first edge portion disposed outside of the first slit and a second edge portion disposed outside of the second slit, and the first planar portion having a plurality of ribs on the first side of the first edge portion and the second edge portion; and
      a second portion including a first angle plate and a second angle plate, the first and second angle plates attached to a first end of the first planar portion and extending outward from the first planar portion such that a first angle is formed between the first angle plate and the second angle plate; and
   a flag secured to a flag shaft, wherein the flag shaft is guided by the plurality of ribs on the first side of the first and second edge portions and clamped between the first side of the first and second edge portions and the second side of the deflectable middle portion.

2. The flag attachment system of claim 1, wherein the deflectable middle portion further comprises a recessed channel on the second side.

3. The flag attachment system of claim 1, wherein the deflectable middle portion includes a substantially flat second side.

4. The flag attachment system of claim 1, wherein a first pair of ribs is situated on the first edge portion of the first side and a second pair of ribs is situated on the second edge portion of the first side.

5. The flag attachment system of claim 4, wherein an aligned channel is formed between the two ribs of the first pair of ribs and the two ribs of the second pair of ribs.

6. The flag attachment system of claim 1 wherein the first angle plate and second angle plate are adapted to deflect toward or away from one another such that in a first, substantially open position, the first angle is formed between them, and in a second, compressed position, a second angle is formed between them that is less than the first angle.

* * * * *